Figure 1:
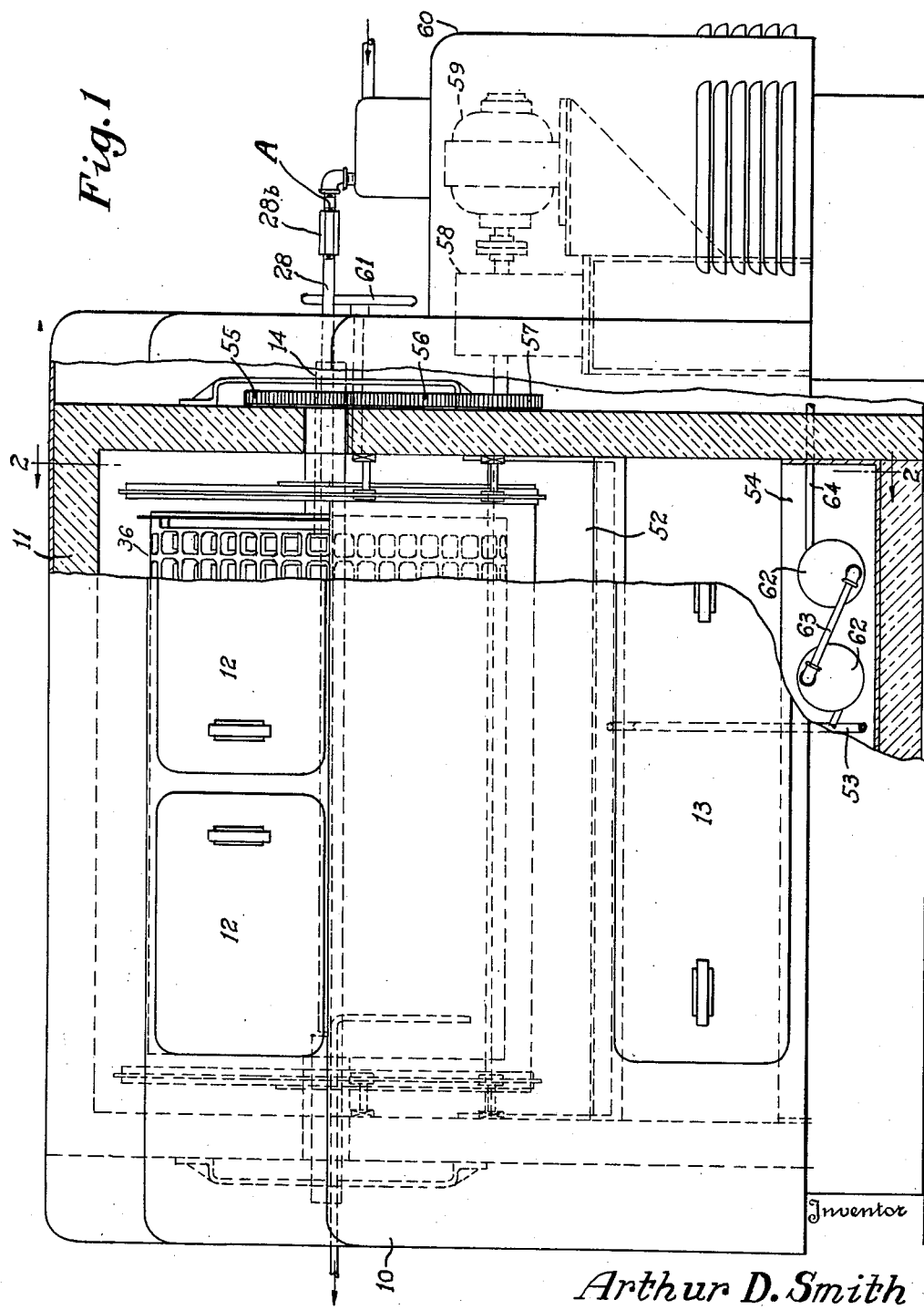

May 23, 1950     A. D. SMITH     2,508,625
APPARATUS FOR MAKING ICE CUBES

Filed March 18, 1946     5 Sheets-Sheet 1

Inventor
Arthur D. Smith
By Frease & Bishop
Attorneys

May 23, 1950　　　　A. D. SMITH　　　　2,508,625
APPARATUS FOR MAKING ICE CUBES
Filed March 18, 1946　　　　　　　　　　5 Sheets-Sheet 2

Inventor
Arthur D. Smith
By Frease and Bishop
Attorneys

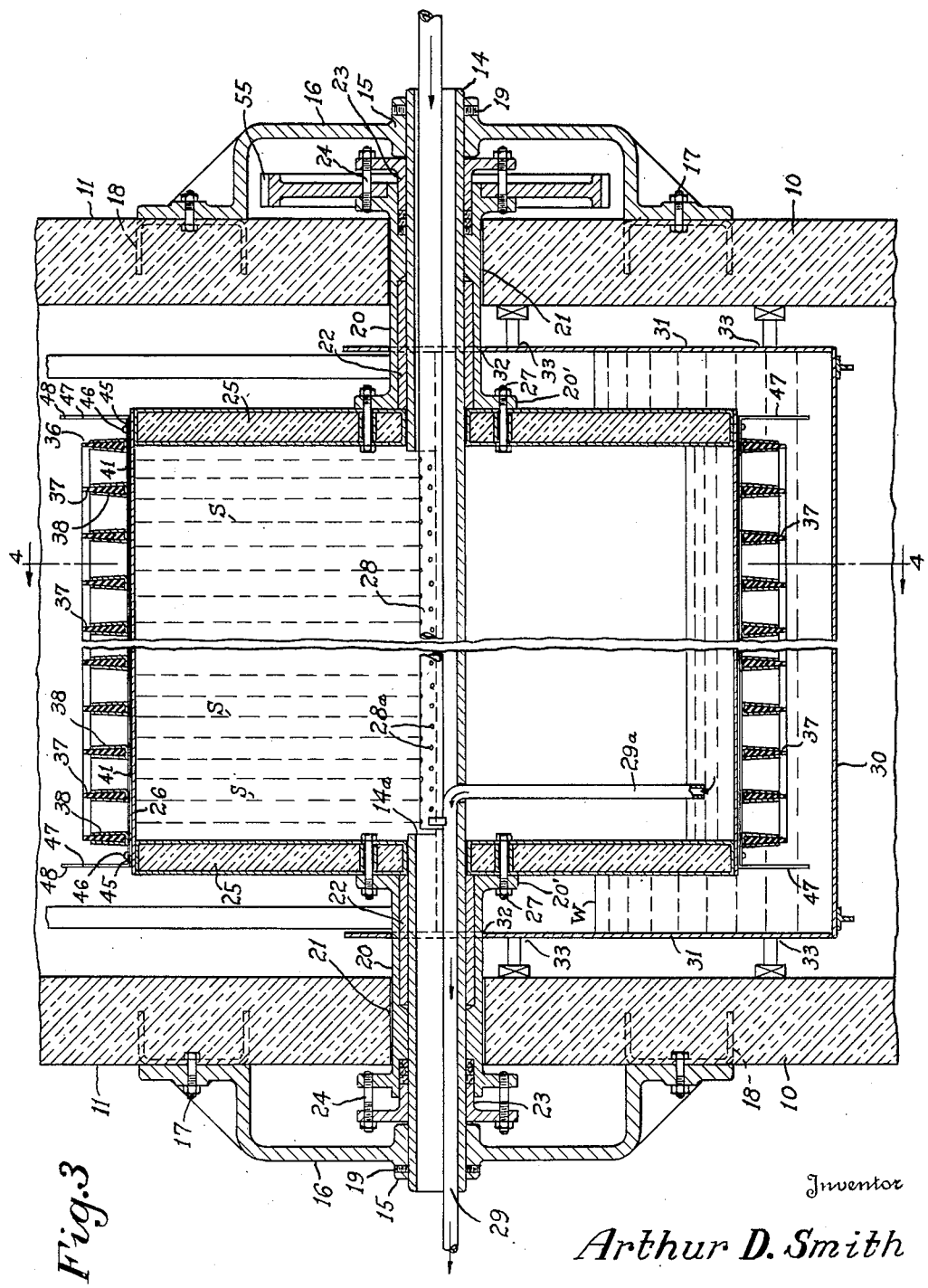

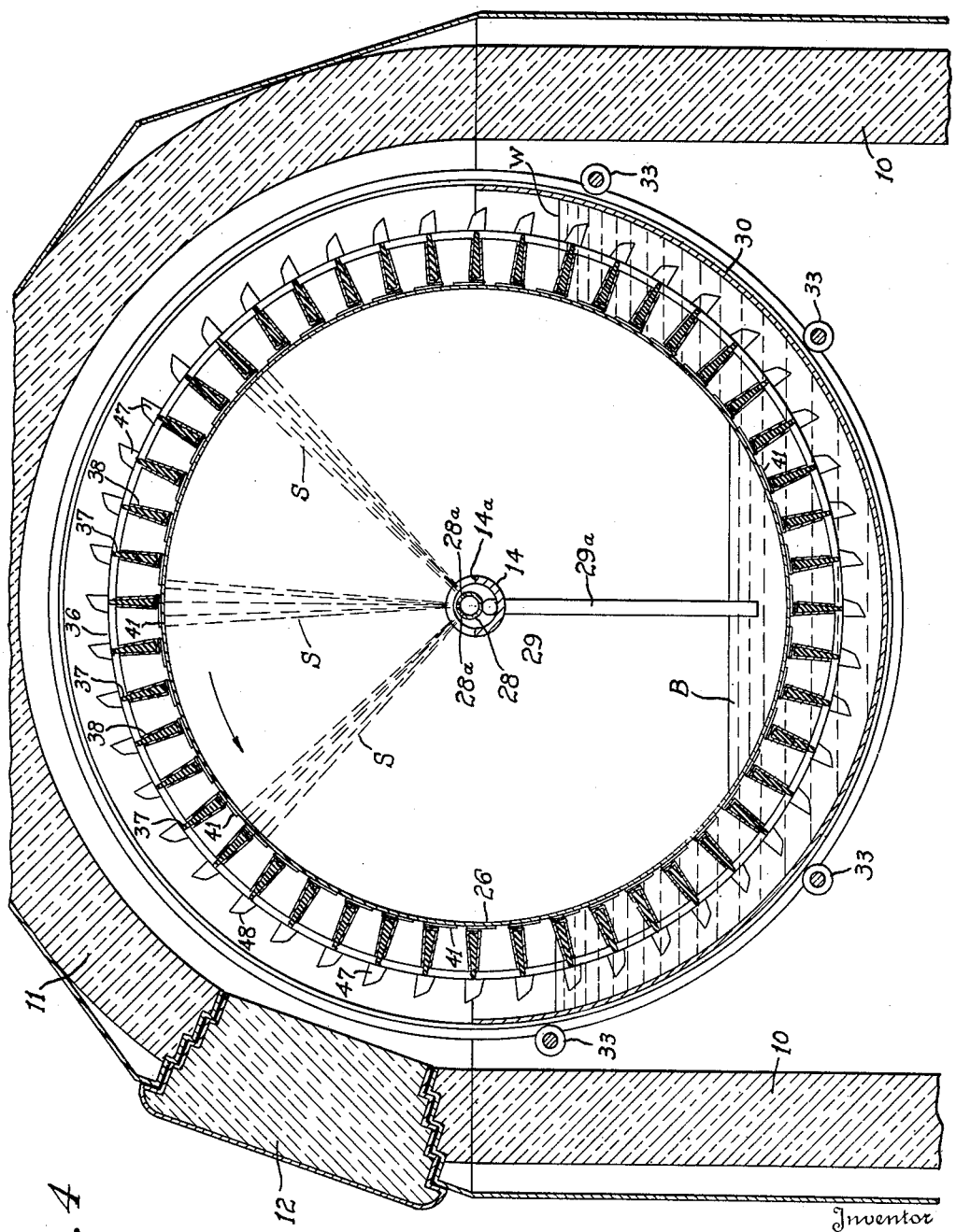

May 23, 1950  A. D. SMITH  2,508,625
APPARATUS FOR MAKING ICE CUBES
Filed March 18, 1946  5 Sheets-Sheet 5
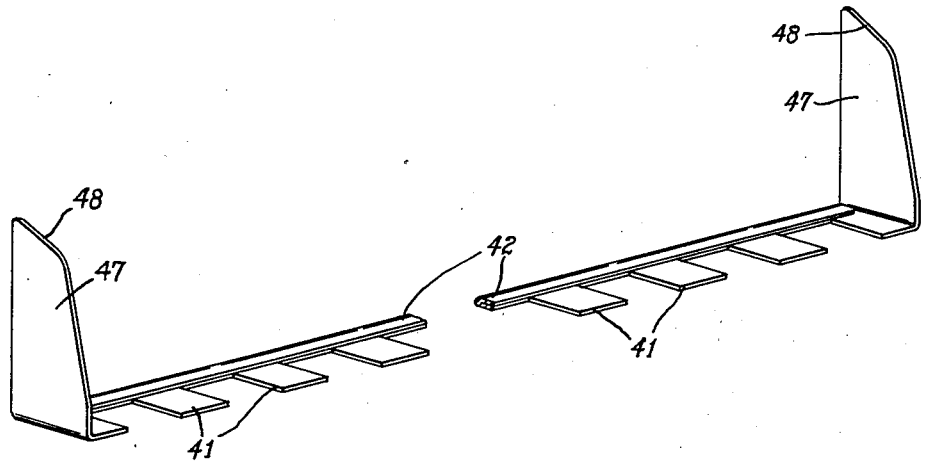
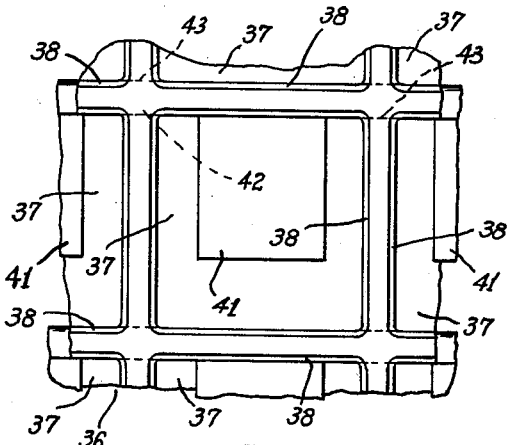
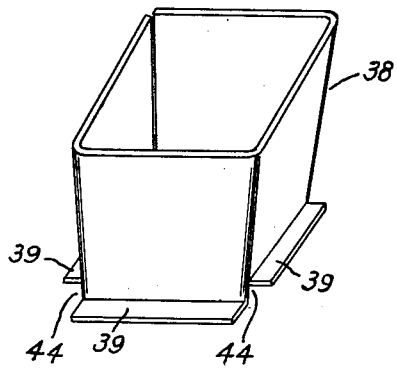
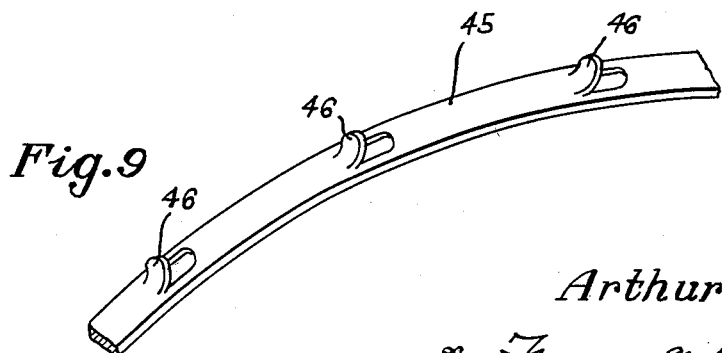
Inventor
Arthur D. Smith
By Frease and Bishop
Attorneys Patented May 23, 1950

2,508,625

UNITED STATES PATENT OFFICE 2,508,625

APPARATUS FOR MAKING ICE CUBES

Arthur D. Smith, Canton, Ohio, assignor to Barium Steel Corporation, Canton, Ohio, a corporation of Delaware Application March 18, 1946, Serial No. 655,203

17 Claims. (Cl. 62—106)

1

The invention relates to improvements in ice making apparatus and more particularly to a machine for manufacturing ice cubes.

There is a growing demand for ice cubes or small pieces of ice for commercial use, and under present practice in ice manufacturing plants it is customary to freeze the ice in large blocks which are then sawed or cut into cubes, adding considerably to the cost of the cubes because of the labor and power required for this operation, and further resulting in the loss of about 33% of the ice during the sawing or cutting operation.

In order to meet this rapidly growing demand for ice cubes, and to more economically produce the same, I developed and perfected the ice cube manufacturing apparatus forming the subject matter of my prior application, Serial No. 553,735, filed September 12, 1944, now Patent 2,403,406, dated July 2, 1946, and this machine operates very efficiently to economically produce cube ice in a minimum time.

There are however a considerable number of business places equipped with the ordinary cold brine system for the making of ice in relatively small quantities, and it is an object of the present invention to adapt the improved ice cube making machine for use with the cold brine system so that business places equipped with such brine systems may make use of the advantages and benefits of my improved ice cube manufacturing apparatus without replacing the cold brine systems with which they are equipped.

Another object is to provide an improved ice cube manufacturing apparatus including a rotary drum having individual cube molds around its periphery, the drum being rotatable within a stationary cylinder containing water for freezing, a brine spray nozzle being located within the rotary drum for continually spraying cold brine upon the inner walls thereof.

A further object is to provide means for removing the brine from the lower portion of the rotary cylinder and returning it to the cold brine system for cooling and re-circulation within the drum.

A still further object is to provide means for continuously spraying the cold brine upon the upper portions of the interior wall of the rotary cylinder throughout its entire length.

It is another object of the invention to provide certain improvements in the construction of the individual cube molds.

Still another object is to provide individual cube molds in the form of a honey-combed cylinder of rubber fitting around the periphery of the rotary cylinder.

A further object is to provide such a rubber mold structure in which a hollow, rectangular insert of sheet copper, or the like, is located within each individual cube mold in order to expedite the freezing of the ice cubes therein.

A still further object is to provide such sheet metal inserts with out-turned flanges at their lower ends for engagement under the honey-combed rubber mold structure, and for contact with the outer surface of the rotary metal cylinder.

It is another object of the invention to provide apparatus of the character referred to in which pivoted flaps are provided in the bottoms of the individual cube molds for quickly and readily harvesting the cubes after they have been frozen.

Still another object is to provide an ice cube machine of this type in which means is provided in the housing for automatically operating the flaps as the cylinder is rotated, whereby all of the ice cubes may be removed from the molds in a single revolution of the cylinder.

Figures 2, 5:
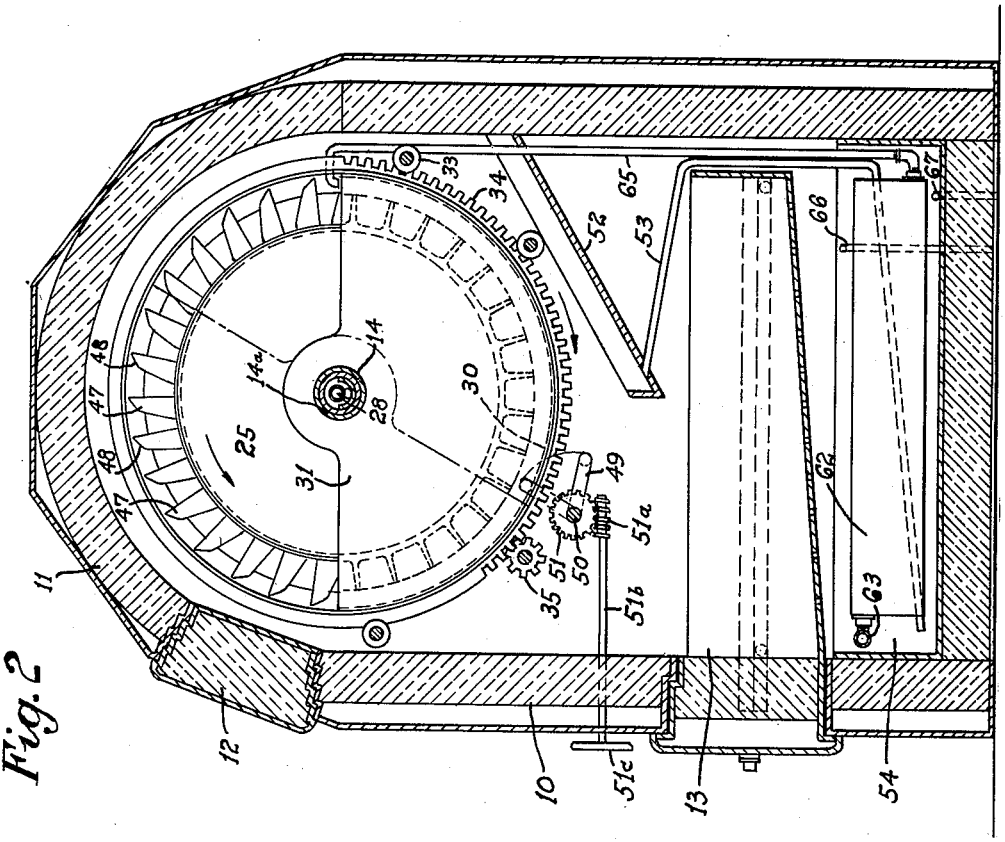

The above objects, together with others which will be apparent from the drawings and following description, or which may be later referred to, may be attained by constructing the improved ice cube making machine in the manner hereinafter described in detail and illustrated in the accompanying drawings, in which:

Figure 1 is a side elevation of the complete machine with parts broken away for the purpose of illustration;

Fig. 2 a transverse sectional view through the machine, taken as on the line 2—2, Fig. 1;

Fig. 3 an enlarged, longitudinal sectional view through the end portion of the cabinet and through the normally stationary water jacket and the rotatable drum therein;

Fig. 4 a transverse, sectional view taken as on the line 4—4, Fig. 3;

Fig. 5 an enlarged detail sectional view through some of the ice cube molds upon the rotatable drum;

Fig. 6 an enlarged plan view of one of the individual ice cube molds with portions of adjacent molds;

Fig. 7 a detached perspective view of one of the sheet metal inserts used in the individual ice cube molds;

Fig. 8 a detached perspective view of one of the pivoted bars with the flaps thereon for removing the cubes from the molds, and;

Fig. 9 a fragmentary perspective view of a portion of one of the bands or rings upon which the flap carrying rods are pivoted.

The machine may be housed in a cabinet indicated generally at 10, formed of suitable heat and cold insulation material and preferably having the substantially half-round top portion 11 which may be detached in order to provide access to the interior thereof for removing, replacing or repairing the mechanism therein.

Doors 12 may be formed in the top portion 11 in order to permit observation of the cube freezing apparatus during the operation of the machine. A sliding drawer 13, preferably of the roller suspension type as shown, is provided in the lower portion of the cabinet for removing the harvested ice cubes in a manner to be later described in detail.

A hollow shaft 14 is located longitudinally through the cabinet 10, preferably at the point of separation of the cabinet and the half-round top 11 thereof, the opposite ends of this shaft being mounted within the cylindrical flanges 15 of the supporting brackets 16, which are attached to the end walls of the cabinet as by bolts 17 located through the U-shape supports 18 embedded within the walls of the cabinet, set screws 19 being provided in the flanges 15 for rigidly mounting the hollow shaft 14 therein.

Bearings 20 are rotatably mounted upon the end portions of the hollow shaft 14, said bearings being located through suitable apertures 21 formed in the end walls of the cabinet, and a bronze bushing 22 may be located within the inner end portion of each of the bearings 20, and a stuffing box 23 may be provided at the outer end portion of each bearing, being adjusted as by the bolts 24.

Located within the cabinet and rotatable upon the shaft 14 is a hollow, rotatable drum which may comprise the insulated heads 25 and the sheet metal cylinder 26 to opposite ends of which the heads 25 are fixed. This drum is attached to the bearings 20 as by the bolts 27 located through the insulated drum heads 25 and through the flanges 20' formed at the inner ends of the bearings 20, whereby these bearings form journals for rotatably mounting the drum upon the stationary shaft 14.

Substantially the top half of the hollow shaft 14 may be cut away within the drum, as indicated at 14a. A brine spray nozzle 28 is inserted through one end of the hollow shaft 14 and located entirely throughout the length of the drum and provided with a multiplicity of apertures or jets 28a whereby cold brine may be sprayed upwardly against the inner walls of the metal cylinder 26 of the drum.

For the purpose of removing the spray nozzle 28 or to clean, repair or replace the same, a coupling 28b may be provided at a point exterior of the cabinet for detachably connecting the spray nozzle to any suitable pipe as indicated at A, leading from the ordinary cold brine system.

Warm brine may be withdrawn from the lower portion of the drum through the brine return pipe 29, having a depending portion 29a extending to a point spaced from the bottom of the drum. The brine return pipe 29 is preferably located through the opposite end of the hollow shaft 14 from that through which the spray nozzle 28 is inserted and may return the warm brine to the ordinary cold brine system.

A normally stationary, preferably semi-cylindrical water jacket 30 surrounds the lower portion of the drum and the end walls 31 of the water jacket may be provided with openings 32 of slightly greater diameter than the bearings 20, which are received through said openings, rollers 33 being journalled within the cabinet for rotatably supporting the water jacket.

For the purpose of tilting the water jacket when desired, a gear segment 34 may be fixed thereon meshing with the pinion 35 for rotating the water jacket upon the bearings 20 in a manner to be hereinafter described.

The ice cube molds are preferably in the form of a hollow rubber cylinder or mat, indicated generally at 36, located around the drum and honey-combed throughout its entire area so as to provide a multiplicity of individual ice cube molds 37 which may be square, round or of other cross sectional shape and preferably tapered toward their bottoms as shown in the drawings, each of said molds being of suitable size and shape to produce one ice cube.

For the purpose of causing the water to freeze more quickly within the individual ice cube molds, a sheet metal insert is located within each individual mold 37 fitting around the inner walls thereof, these inserts being indicated generally at 38.

As best shown in Fig. 7, each insert is formed from a single sheet of copper or other suitable metal, shaped to fit snugly within the mold. In the form shown in the drawings, the individual ice cube molds are square in cross section and tapered toward their bottom ends and the inserts are correspondingly formed into a hollow square tapered toward their lower ends.

Out-turned, terminal flanges 39 are formed at the lower end of each sheet metal insert 38, and located beneath the partition walls 40 of the honey-combed rubber cylinder or mat and in contact with the sheet metal cylinder 26 of the drum so as to conduct the cooling effect of the cold brine within the drum entirely around the inside of each ice cube mold to more rapidly freeze the water therein.

As clearly shown in the drawings, the upper or outer edges of the sheet metal inserts 38 terminate at a point spaced below the upper or outer ends of the partition walls 40 of the rubber mat or cylinder which divide the same into a plurality of individual ice cube molds, so as to prevent ice from forming over the outer edges of these partition walls and freezing adjacent cubes together.

For the purpose of quickly removing the ice cubes from the molds after they have been formed, a pivoted flap 41 of copper or other suitable sheet metal is located in the bottom of each individual ice cube mold, the flaps of each longitudinal row of molds being mounted upon a bar or rod which may be formed in the manner shown in the drawings by stamping all of the flaps for each row from a single sheet or strip of copper or other suitable sheet metal and reinforcing one edge thereof as by folding the metal back upon itself as indicated at 42.

Each of these rods 42, as well as the flaps 41 carried thereby, lies flat against the periphery of the metal cylinder 26 of the drum and in order to accommodate the same, notches 43 are formed in the inner surface of the rubber cylinder or mat 36 and similar notches 44 are formed in the lower ends of the sheet metal inserts 38.

A metal ring or band 45 may be located around each end portion of the cylinder 26 of the drum and provided with stamped out ears or lugs 46 to form pivotal points for the rods 42. Angular fingers 47, preferably tapered as shown and provided with bevelled ends 48, are integrally formed upon or rigidly connected to the ends of the rods 42 which carry the flaps 41.

A substantially U-shape bar 49 is pivoted as at 50 within the cabinet, preferably at a point below the center of the drum and at one side thereof and provided with the worm gear 51 meshing with the worm screw 51a upon the shaft 51b which extends through one side of the casing and is provided with a hand wheel 51c by means of which the bar 49 may be rotated into the path of the fingers 47.

An inclined ice chute 52 may be located beneath the water jacket 31 and above the drawer 13, a drain pipe 53 leading from the lower portion of said chute to the heat exchange chamber 54, located in the cabinet below the drawer.

A gear wheel 55 is fixed upon one of the bearings 20 and meshes with an idler gear 56, which in turn meshes with the pinion 57 upon the speed reducer 58, which is driven by the motor 59 within the housing 60 for rotating the drum in the direction of the arrows shown on the drawings at the desired speed.

A heat exchange chamber 54 is located in the cabinet below the ice cube drawer 13, and drain pipe 53 discharges therein. This heat exchange is for the purpose of furnishing cold water to the jacket 31, and preferably contains a plurality of cylinders or similar receptacles 62, connected together by pipes 63, water being admitted to one end of the series of cylinders through a pipe 64, leading from a suitable source of water supply, and a discharge pipe 65 is connected to the other end of the series of cylinders and extends up through the cabinet to a point where it may discharge cooled water into the jacket 31 when it is desired to fill the same. An overflow pipe 66 is provided in the upper portion of the heat exchange chamber 54 and connects to a drain pipe 67.

With this arrangement the ice water discharged from the jacket, when the ice cubes are harvested in the manner to be later described, will surround the series of cylinders 62, cooling the water passing through said cylinders.

In the operation of the machine to produce ice cubes, the parts are positioned as shown in the drawings and cold brine from the usual cold brine system is pumped into the spray nozzle 28 and sprayed upwardly upon the inner walls of the hollow cylinder 26 of the drum as indicated at S in Figs. 3 and 4, continuously contacting the inner entire surface of the cylinder as the drum is rotated and flowing down the walls to collect in the bottom of the drum as indicated at B from which point the warm brine is withdrawn through the vertical portion 29a of the return pipe 29 and returned to the cold brine system for cooling and recirculating.

Water is placed in the jacket 30 to about the level indicated at W and the motor 59 is operated to rotate the drum 26 continuously in the direction of the arrows shown in Figs. 2 and 4, the ice cube molds being alternately submerged in the water as the drum rotates.

The cold brine being continuously sprayed upon the interior of the cylinder 26 of the drum rapidly cools this cylinder and the metal inserts 38 of the individual ice cube molds and as the operation continues ice is built up upon the inner walls of each ice cube mold until each of the molds is filled with a cube of ice.

It is pointed out that the metal inserts 38, located within the individual cube molds of the rubber mat or cylinder, are a very important factor in much more quickly freezing ice cubes in the molds. Since the flanges 39 at the lower ends of these metal inserts are in contact with the outer surface of the metal drum, the inner surface of which is being continuously cooled by the cold brine, it will be seen that these metal inserts are rapidly cooled, heat being conducted from the same directly through the metal drum to the brine.

In actual practice it has been found that where these metal inserts are used within the rubber molds twice the amount of ice is formed therein as is formed in the rubber molds without metal inserts in the same period of time and at the same temperature. It should be understood that this results in producing full size ice cubes with the metal inserts in considerably less than half of the time required for forming full size cubes without the metal inserts for the reason that ice forms much more rapidly in the lower portions of the molds than in the upper portions thereof.

The outer ends of the rubber partition walls 37 project beyond the said metal inserts 38 preventing ice from forming over the ends of the molds so that all of the frozen cubes of ice will be separate from each other.

When the freezing operation has been completed warm brine or other warm liquid may be admitted to the spray nozzle 28 and sprayed upon the interior of the drum 26 tending to loosen each of the ice cubes so that it may be more easily removed from the individual molds.

Then the wheel 61 upon the shaft of the pinion 35 may be operated, so that the pinion 35 through the gear segment 34, will rotate the normally stationary water jacket 30 to the broken line position shown in Fig. 2, permitting the water to drain therefrom through the perforate ice chute 52 and into the water drain basin 53 from which it is withdrawn by the drain pipe 54.

The U-shape bar 49 is then operated by means of the hand wheel 51c swinging the same into the broken line position shown in Fig. 2, into the path of the fingers 47 upon the ends of the flap bars 42, and as the drum continues to rotate all of the ice cubes will be quickly ejected from the molds in one revolution of the drum.

The cubes in each longitudinal row of molds will be simultaneously ejected as the flaps 41 in that row of molds are tilted upwardly into the molds by contact of the fingers 47 with the U-shape bar 49, the cubes as they are ejected from the molds sliding down the inclined perforate ice chute 52 and into the sliding drawer 13 from which they may be removed from the cabinet.

From the above it will be obvious that a simple, inexpensive and easily operated machine is provided for quickly and economically producing ice cubes in large quantities. The advantages of my rotary ice cube making machine disclosed in my Patent 2,403,406, above referred to, being thus made available to plants equipped with the ordinary cold brine system.

It will further be seen that the sheet metal inserts surrounding the interiors of the individual ice cube molds and in contact with the metal peripheries of the drum cylinder provide for rapidly freezing the water to form cubes in the individual molds, while the rubber partition walls extending outward beyond the upper ends of the metal inserts prevent ice from forming over the outer edges of the ice cube molds, thus preventing waste in forming and releasing the ice cubes.

It will also be obvious that the pivoted flaps, forming the bottoms of the individual ice cube molds which are automatically tilted upward into the molds by contact of the fingers 47 with the U-shape bar 49 will automatically eject all of the ice cubes from the drum in a single rotation thereof.

An important feature of the invention is the projecting of the rubber partitions 36 of the ice cube molds beyond the sheet metal inserts 38 so that the ice cubes will be formed of uniform size and shape and in freezing, the ice will not form over the edges of the molds in mushroom shape, as such conditions make the cubes hard to get out of the molds.

Attention is also called to the fact that agitation of the brine and the water by rotation of the drum facilitates the freezing action, the continuous movement of the molds through the water acting to continuously agitate the water with the result that no air bubbles are contained within the thin films of water successively picked up by each mold.

Therefore cloudy ice is avoided and clear ice is formed within the molds, eliminating the necessity of using other equipment for removing the entrained air from the water being frozen.

Furthermore, since impurities dissolved in water lower its freezing point, the thin film of ice formed in each mold during that part of its revolution when above the water, is washed by the water on its immersion during the balance of the revolution and the impurities ejected to the surface of the film are washed off and concentrate in the water. When the impurities become so concentrated in the water as to exceed the solubilities the excess impurities precipitate to the bottom of the water jacket.

This is a distinct advantage over the common practice of agitating the water by a pump, as this does not produce agitation when the molds are upside down and moving slowly, at which time the water in the bottom portions of the molds is not sufficiently agitated to produce clear ice. The present machine contemplates movement of the drum at about 8 revolutions per minute, thus producing continuous agitation.

In the operation of the present machine only a relatively small amount of brine is in the drum at any one time and when it is desired to thaw the ice cubes, it is only necessary to withdraw this small amount of brine and eject warm brine or other warm liquid through the spray nozzle which will quickly raise the temperature of the molds sufficiently to thaw the ice cubes to such extent that they may be quickly released and ejected from the molds by the operation of the flaps as above described.

I claim:

1. An apparatus for freezing ice cubes, comprising a stationary hollow shaft, a normally stationary water jacket, a drum rotatably mounted upon the shaft within said water jacket, ice cube molds around the periphery of the drum, the top portion of the hollow shaft being cut away within the drum, a spray nozzle in said hollow shaft formed with apertures opposite the cut out portion of said shaft and means for introducing cold brine into the spray nozzle to spray the brine upwardly upon the inner wall of the drum.

2. An apparatus for freezing ice cubes, comprising a stationary hollow shaft, a normally stationary water jacket, a drum rotatably mounted upon the shaft within said water jacket, ice cube molds around the periphery of the drum, the top portion of the hollow shaft being cut away within the drum, a spray nozzle in said hollow shaft formed with apertures opposite the cut out portion of said shaft and means for introducing cold brine into the spray nozzle to spray the brine upwardly upon the inner wall of the drum, and a brine return pipe in said hollow shaft communicating with the lower portion of the drum.

3. An apparatus for freezing ice cubes, comprising a stationary hollow shaft, a normally stationary water jacket, a drum rotatably mounted upon the shaft within said water jacket, ice cube molds around the periphery of the drum, hollow bearing members fixed to opposite ends of the drum and rotatably mounted upon said hollow shaft, driving means operatively connected to one of said bearing members for rotating the drum, the top portion of the hollow shaft being cut away within the drum, a spray nozzle in said hollow shaft formed with apertures opposite the cut out portions of said shaft, and means for introducing cold brine into the spray nozzle to spray the brine upwardly upon the inner wall of the drum.

4. An apparatus for freezing ice cubes, comprising a stationary hollow shaft, a normally stationary water jacket, a drum rotatably mounted upon the shaft within said water jacket, ice cube molds around the periphery of the drum, hollow bearing members fixed to opposite ends of the drum and rotatably mounted upon said hollow shaft, driving means operatively connected to one of said bearing members for rotating the drum, the top portion of the hollow shaft being cut away within the drum, a spray nozzle in said hollow shaft formed with apertures opposite the cut out portions of said shaft, and means for introducing cold brine into the spray nozzle to spray the brine upwardly upon the inner wall of the drum, and a brine return pipe in said hollow shaft communicating with the lower portion of the drum.

5. An apparatus for freezing ice cubes, comprising a stationary hollow shaft, a normally stationary water jacket, a drum rotatably mounted upon the hollow shaft within the water jacket, insulation heads in said drum, ice cube molds around the periphery of the drum, hollow bearing members fixed to the insulation heads and rotatably mounted upon the hollow shaft, driving means operatively connected to one of said bearing members for rotating the drum, the top portion of the hollow shaft being cut away within the drum, a spray nozzle in said hollow shaft formed with apertures opposite the cut out portions of said shaft, and means for introducing cold brine into the spray nozzle to spray the brine upwardly upon the inner wall of the drum.

6. An apparatus for freezing ice cubes, comprising a stationary hollow shaft, a normally stationary water jacket, a drum rotatably mounted upon the hollow shaft within the water jacket, insulation heads in said drum, ice cube molds around the periphery of the drum, hollow bearing members fixed to the insulation heads and rotatably mounted upon the hollow shaft, driving means operatively connected to one of said bearing members for rotating the drum, the top portion of the hollow shaft being cut away within the drum, a spray nozzle in said hollow shaft formed with apertures opposite the cut out portions of said shaft, and means for introducing cold brine into the spray nozzle to spray the brine upwardly upon the inner wall of the drum, and a brine return pipe in said hollow shaft communicating with the lower portion of the drum.

7. An apparatus for freezing ice cubes, comprising an insulated cabinet, supporting brackets on opposite end walls of the cabinet, a stationary hollow shaft located through the cabinet and fixed to the brackets, hollow bearings journalled upon the end portions of the shaft and located through the end walls of the cabinet, a rotatable drum mounted upon said bearings, ice cube molds around the periphery of the drum, a normally stationary water jacket within the cabinet and surrounding the drum, driving means operatively connected to one of said bearings for rotating the drum, the top portion of the hollow shaft being cut away within the drum, a spray nozzle in said hollow shaft formed with apertures opposite the cut out portion of said shaft, and means for introducing cold brine into the spray nozzle to spray the brine upwardly upon the inner wall of the drum.

8. An apparatus for freezing ice cubes, comprising an insulated cabinet, supporting brackets on opposite end walls of the cabinet, a stationary hollow shaft located through the cabinet and fixed to the brackets, hollow bearings journalled upon the end portions of the shaft and located through the end walls of the cabinet, a rotatable drum mounted upon said bearings, ice cube molds around the periphery of the drum, a normally stationary water jacket within the cabinet and surrounding the drum, driving means operatively connected to one of said bearings for rotating the drum, the top portion of the hollow shaft being cut away within the drum, a spray nozzle located in said hollow shaft formed with apertures opposite the cut-out portion of said shaft, and means for introducing cold brine into the spray nozzle to spray the brine upwardly upon the inner wall of the drum, and a brine return pipe in said hollow shaft communicating with the lower portion of the drum.

9. An apparatus for freezing ice cubes, comprising a water jacket for containing water to be frozen, a hollow metal drum rotatable within said water jacket, ice cube molds comprising a hollow, rubber, honey-combed cylinder located around the periphery of the drum and providing a plurality of individual ice cube molds, a sheet metal insert fitted into each of the openings through said cylinder, and means for introducing a refrigerant within the drum and means for rotating the drum.

10. An apparatus for freezing ice cubes, comprising a water jacket for containing water to be frozen, a hollow metal drum rotatable within said water jacket, ice cube molds comprising a hollow, rubber, honey-combed cylinder located around the periphery of the drum and providing a plurality of individual ice cube molds, a sheet metal insert fitted into each of the openings through said cylinder, and terminating below the top thereof, and means for introducing a refrigerant within the drum and means for rotating the drum.

11. An apparatus for freezing ice cubes, comprising a water jacket for containing water to be frozen, a hollow metal drum rotatable within said water jacket, ice cube molds comprising a hollow, rubber, honey-combed cylinder located around the periphery of the drum and providing a plurality of individual ice cube molds, a sheet metal insert fitted into each of the openings through said cylinder and having its lower end in contact with the metal drum, and means for introducing a refrigerant within the drum and means for rotating the drum.

12. An apparatus for freezing ice cubes, comprising a water jacket for containing water to be frozen, a hollow metal drum rotatable within said water jacket, ice cube molds comprising a hollow, rubber, honey-combed cylinder located around the periphery of the drum and providing a plurality of individual ice cube molds, a sheet metal insert fitted into each of the openings through said cylinder and having out-turned flanges at its lower end located beneath the rubber molds and in contact with the metal drum, and means for introducing a refrigerant within the drum and means for rotating the drum.

13. An apparatus for freezing ice cubes, comprising a water jacket for containing water to be frozen, a hollow metal drum rotatable within said water jacket, ice cube molds comprising a hollow, rubber, honey-combed cylinder located around the periphery of the drum and providing a plurality of individual ice cube molds, a sheet metal insert fitted into each of the openings through said cylinder and terminating below the top thereof, out-turned flanges at the lower end of each insert located beneath the rubber molds and in contact with the metal drum, and means for introducing a refrigerant within the drum and means for rotating the drum.

14. An apparatus for freezing ice cubes, comprising a trough like water jacket for containing water to be frozen, means for inverting said water jacket, a hollow drum rotatable within said water jacket, ice cube molds located around the periphery of the drum, means for introducing a refrigerant within the drum, means for rotating the drum, an axially pivoted bar located longitudinally upon the drum beneath each row of the ice cube molds and having a plurality of flaps fixed thereon and located in the bottoms of the individual ice cube molds, and means operable when said water jacket is inverted for oscillating each bar upon its axis to remove ice cubes from the molds.

15. An apparatus for freezing ice cubes, comprising a trough like water jacket for containing water to be frozen, means for inverting said water jacket, a hollow drum rotatable within said water jacket, ice cube molds located around the periphery of the drum, means for introducing a refrigerant within the drum, means for rotating the drum, an axially pivoted bar located longitudinally upon the drum beneath each row of the ice cube molds and having a plurality of flaps fixed thereon and located in the bottoms of the individual ice cube molds, rigid fingers upon the ends of the bars and means movable into the path of said fingers when said water jacket is inverted for oscillating each bar upon its axis to remove ice cubes from the molds.

16. An apparatus for freezing ice cubes, comprising a stationary hollow shaft, a drum rotatably mounted up said shaft, ice cube molds around the periphery of the drum, the top portion of the hollow shaft being cut away within the drum, a spray nozzle in said hollow shaft formed with apertures opposite the cut out portion of said shaft, means for introducing a refrigerant into the spray nozzle to spray the refrigerant upwardly upon the inner wall of the drum, and means for supplying water to be frozen into said ice cube molds.

17. An apparatus for freezing ice cubes, comprising a rotatable hollow metal drum, ice cube molds comprising a hollow, rubber, honeycombed cylinder located around the periphery of the drum and providing a plurality of individual ice cube molds, a sheet metal insert fitted into each of the openings through said cylinder, means for introducing a refrigerant within the drum, means for rotating the drum, and means for supplying water to be frozen into said ice cube molds.

ARTHUR D. SMITH.

REFERENCES CITED

The following references are of record in the file of this patent:

UNITED STATES PATENTS

| Number | Name | Date |
|---|---|---|
| Re. 10,522 | Linde | Sept. 16, 1884 |
| 1,963,842 | Gay | June 19, 1934 |
| 2,054,101 | Short | Sept. 15, 1936 |
| 2,064,655 | Geyer | Dec. 15, 1936 |
| 2,342,743 | Lutes et al. | Feb. 29, 1944 |